United States Patent [19]

Pryor

[11] Patent Number: 4,753,569
[45] Date of Patent: Jun. 28, 1988

[54] ROBOT CALIBRATION

[75] Inventor: Timothy R. Pryor, Tecumseh, Canada

[73] Assignee: Diffracto, Ltd., Windsor, Canada

[21] Appl. No.: 894,721

[22] Filed: Aug. 8, 1986

Related U.S. Application Data

[63] Continuation of Ser. No. 750,049, Jun. 27, 1985, abandoned, which is a continuation of Ser. No. 453,910, Dec. 28, 1982, abandoned.

[51] Int. Cl.⁴ ............................................. B66C 1/00
[52] U.S. Cl. .................................. 414/730; 250/227; 901/9; 901/47; 364/559
[58] Field of Search ...................... 414/730; 901/9, 46, 901/47; 250/203, 227; 358/107, 903; 364/559; 356/152

[56] References Cited

U.S. PATENT DOCUMENTS

| | | | |
|---|---|---|---|
| 3,007,097 | 10/1961 | Shelley et al. | 901/47 X |
| 3,244,894 | 4/1966 | Steele et al. | 250/227 |
| 3,888,362 | 6/1975 | Fletcher et al. | 414/620 |
| 4,047,816 | 9/1977 | Pell et al. | 356/152 |
| 4,146,924 | 3/1979 | Birk et al. | 364/513 |
| 4,219,847 | 8/1980 | Pinkney et al. | 901/47 X |
| 4,260,187 | 4/1981 | Bejczy | 356/152 X |
| 4,356,554 | 10/1982 | Susnjara et al. | 364/513 |
| 4,396,945 | 8/1983 | Di Matteo et al. | 901/47 X |
| 4,402,053 | 8/1983 | Kelley et al. | 901/47 X |
| 4,453,085 | 6/1984 | Pryor | 901/47 X |
| 4,460,826 | 7/1984 | Pryor | 250/227 |
| 4,570,065 | 2/1986 | Pryor | 901/47 X |

FOREIGN PATENT DOCUMENTS

| | | |
|---|---|---|
| 96830 | 12/1983 | European Pat. Off. ........ 901/47 X |
| 0042960 | 11/1984 | European Pat. Off. . |
| 2430058 | 1/1976 | Fed. Rep. of Germany . |
| 53-000464 | 1/1978 | Japan . |

OTHER PUBLICATIONS

Andreiev, Nikita "Machines Identify, Measure, and Inspect, Yet Fall Short of Vision", Control Engineering, Nov. 1980.

Primary Examiner—Robert J. Spar
Assistant Examiner—Jennifer Doyle
Attorney, Agent, or Firm—Larson and Taylor

[57] ABSTRACT

A method and apparatus for calibrating a computer guided robotic apparatus. At least one camera mounted on the robot arm or fixed at the work station views a target comprising a pattern of at least three dots fixed to the other of the robot arm or work station, such viewing taking place as the robot arm approaches the work station to carry out the intended operation. The sensing of any deviation relative to a predetermined target pattern is transmitted to the computer to reset the robot's computerized guidance system.

4 Claims, 1 Drawing Sheet

ROBOT CALIBRATION

This application is a continuation, of application Ser. No. 750,049 filed June 27, 1985, now abandoned, which is a continuation of application Ser. No. 453,910, filed Dec. 28, 1982, now abandoned.

BACKGROUND OF THE INVENTION

This invention relates to robotics, and in particular, it relates to a method and apparatus for calibrating a robot.

The very essence of a robotic apparatus is that its movements are accurately predetermined so as to accurately carry out an intended operation such as handling or working on an object, the latter including, for example, welding or inspecting an object.

To further improve upon the accuracy of a robot's predetermined movements, there is described in my copending applications Ser. No. 262,492, filed May 4, 1981, now U.S. Pat. No. 4,453,085 and Ser. No. 348,803, filed Feb. 16, 1982, systems for guiding the robots through the course of their intended movements, to further enhance the accuracy of such movements.

However, no matter how perfect the original predetermined movements or no matter how accurate the guidance systems for enhancing the robot's movements, the nature of the environment in which the robots are utilized, including environmental conditions exterior to the robot make it virtually impossible to assure perfect positional accuracy at all times.

For example, many robots, particularly multi-joint articulated robots, are generally not capable of maintaining their positional actions over a long period of time. Furthermore when approaching a given desired position from different paths, they often provide different results, even when functioning as a result of the same computer input commands. This can be extremely difficult in a fully flexible automatic factory situation where different path commands may have to be generated by the computer and the robot is expected to follow them under all conditions.

In addition to my co-pending applications which relate to further enhancing the accuracy of the predetermined robot movements, another apparatus quite suitable for this purpose is shown in the Pinkney et al U.S. Pat. No. 4,219,847.

Hence, notwithstanding the improved means discussed above and known heretofore for enhancing guiding of the robot arm, there still exists a need to correct inaccuracies in the robot's position which cannot be corrected using known predetermined and improved guidance means.

SUMMARY OF THE INVENTION

This invention is related to a new method and apparatus, according to which the position of the robot can be perfected as it carries out its intended operation, notwithstanding the limitations on known systems for predetermining and guiding the robot's movements.

This object is carried out in accordance with the present invention by calibrating the robot's position as it approaches the work station, utilizing sensing means independent from the robot's own system for predetermining and guiding the robot's movements, and then sensing any deviation between a calibration signal and a reference signal. This deviation is then used to reset the robot's basic computer guidance system. As a result thereof, as the robot's operative end approaches the work station, any error signals in its basic computerized program are reset so that the robot's arm with its operating end are essentially given a fresh start from the location at which the calibration occurred, which will be in close proximity to the object, thereby in effect cancelling out any errors which preceded the point of calibration.

In a preferred arrangement, the means for calibrating the robot's movements would comprise a camera which cooperates with a target having a predetermined pattern of at least three dots. In one arrangement, one or more cameras would be located on the robot's arm while the targets would be located at fixed locations in the vicinity of the work station such as on the floor, on a pillar, on the fixed part of a conveyor, or the like. In lieu of being mounted on the robot's arm, the cameras can be mounted at a remote location and in communication with sensing points on the robot's arm through fiber optics.

In another preferred arrangement, the targets can be mounted on the robot's arm and the cameras located at fixed positions on the floor, pillars, or the like in the vicinity of the work station.

Hence, it is an object of the present invention to provide a new and improved method and apparatus for further enhancing the accuracy of movements of a robot.

It is still another object of the present invention to provide a new and improved method and apparatus for calibrating movements of a robot in the vicinity of a work station.

It is still another object of the present invention to provide a new and improved method and apparatus which comprises one or more cameras which cooperate with targets in the form of three or more dots, with either the camera or the targets being located on the robot arm and the other of the camera or targets being mounted at fixed positions in the vicinity of the work station.

These and other objects of the present invention will become apparent from the detailed description to follow which is to be taken together with the accompanying drawings.

BRIEF DESCRIPTION OF THE DRAWINGS

There follows a detailed description of preferred embodiments of the present invention to be read together with the accompanying drawings wherein.

DETAILED DESCRIPTION OF THE PREFERRED EMBODIMENTS

There follows a detailed description of the preferred embodiments of the invention, to be read together with the accompanying drawings, wherein like elements are represented by like numerals throughout the several views.

Figure 1:
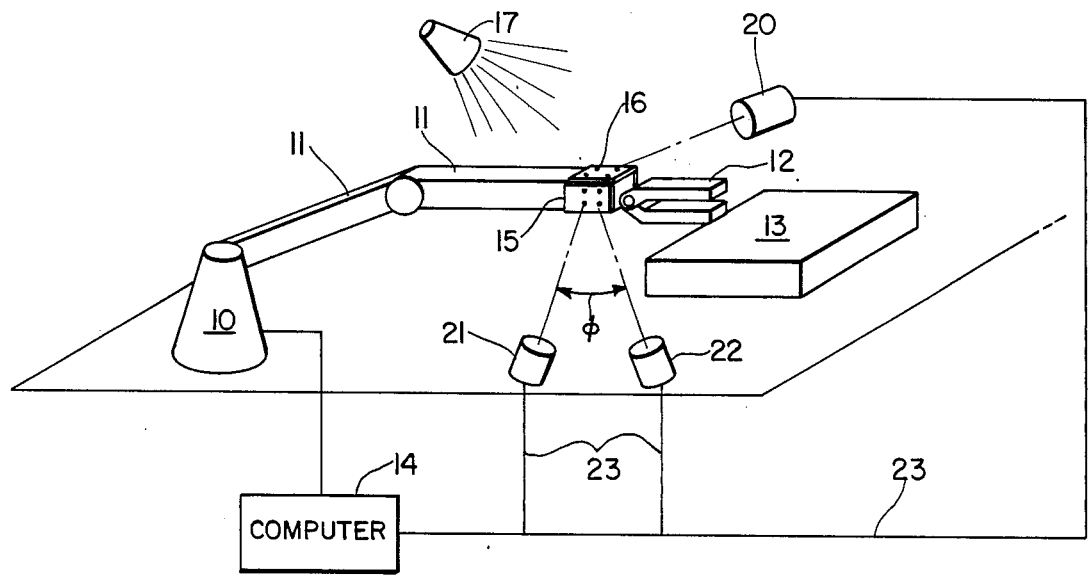
FIG. 1 is a perspective, schematic view of a robot and its work station, utilizing the features of the present invention.

FIG. 1 illustrates a first preferred embodiment of the invention wherein a robotic apparatus 10 fixed to the floor includes an arm 11, in this case a multi-joint arm having an operative end 12. While this operative end can take any form for the purpose of handling or working on an object, including a camera which inspects an object, in the illustrated example there is shown an end effector 12. The work station 13, shown schematically in FIG. 1, represents the area at which the operative end 12 would perform its function on the object.

In a known manner, the movements of the computer for purposes of carrying out the intended operation are controlled by computer 14. However, since it is impossible to guarantee positional accuracy of the operative end 12 under all conditions, there is provided in accordance with the present invention a system for checking and calibrating the position of the robot as it approaches the work station 13. In this embodiment, this system includes one or more targets mounted on the robot arm 11, as illustrated at 15 and 16, and one or more cameras, as illustrated at 20, 21 and 22, each of which cameras are fixed relative to the surrounding environment, as illustrated by the floor level, independently of the robot arm 11. The cameras communicate through lines 23 with the computer 14.

In the embodiment of FIG. 1, as the robot's operative end 12 approaches the work station 13, it passes its target 15 over a camera unit, for example, camera 21 which may be fixed with respect to the floor and in fact buried in the floor of the plant at a location which is presighted with respect to the robot's own coordinate axis. Alternatively, if repeatability is the only factor in question, camera 21 does not have to be presighted but it can be assured that the camera is returned to a certain initial condition point or in any event, its position relative to the robot can be determined.

As illustrated, the target 15 has four dots. Three dots are the minimum for checking the position of the robot arm 11 in up to six axes of coordinate data including X, Y, Z, roll, pitch and yaw. The fourth dot in the pattern provides a check and hence a more accurate calibration. Hence, as the target 15 approached the view of camera 21 the computer 14 dictated that the arm 11 should be in a certain predetermined position. Camera 21 will either confirm this position or note a deviation therein. If a deviation is noted, camera 21 will convey this information back to the computer 14 through lines 23, whereupon the computer 14 will make the corrections in the robot's memory for that position. Since the calibrating system is performing its function in a very limited area, i.e. only in the area close to the work station as the operative end 12 approaches same, it is only correcting the robot position over a very small range. This enables the system to have a high resolution, typically 0.02 mm.

For further resolution, especially in other axes, a two camera solution may be desirable. In this case, a second camera 22 would be provided, which camera also views the target 15, this camera being spaced from the target 15 by an acute included angle $\phi$. In the alternative, the second camera can be located at position 20 which is 90° and in this case the camera would view a duplicate target 16. There may be provided a cube at the end of the robot arm having a plurality of these targets fixed thereon and of course geometrically fixed in reference with respect to each other. The targets may take many different forms such as white dots on a black background, illuminated points of diode lasers or light emitting diodes, fiber ends illuminated from a remote light source, etc. The camera units are typically solid state photodetector arrays of the type having a large number of separate photodetectors, and having an intrinsic digital measuring capability. Such units may have at least 10 but preferably over a hundred separate photo detectors.

A flashed (strobe) target illumination light 17 or flashed target points (diode lasers or light emitting diodes) may be used. This provides the advantage of reading the dots and making the correction while the robot is in motion, i.e. "on-the-fly". If such a flashed light source is utilized, then a position sensing analogue photodetector such as a UDT SC-10 can be used. However, this is drift prone and therefore not necessarily suited to the most accurate mensuration.

For calibration over larger zones of the work area, it may be necessary to mechanically sweep the field of view. This sweep may be accomplished utilizing the guidance structure as disclosed in my above noted U.S. patent application Ser. No. 262,492, but in this case using the targets 15 or the like.

Figure 2:
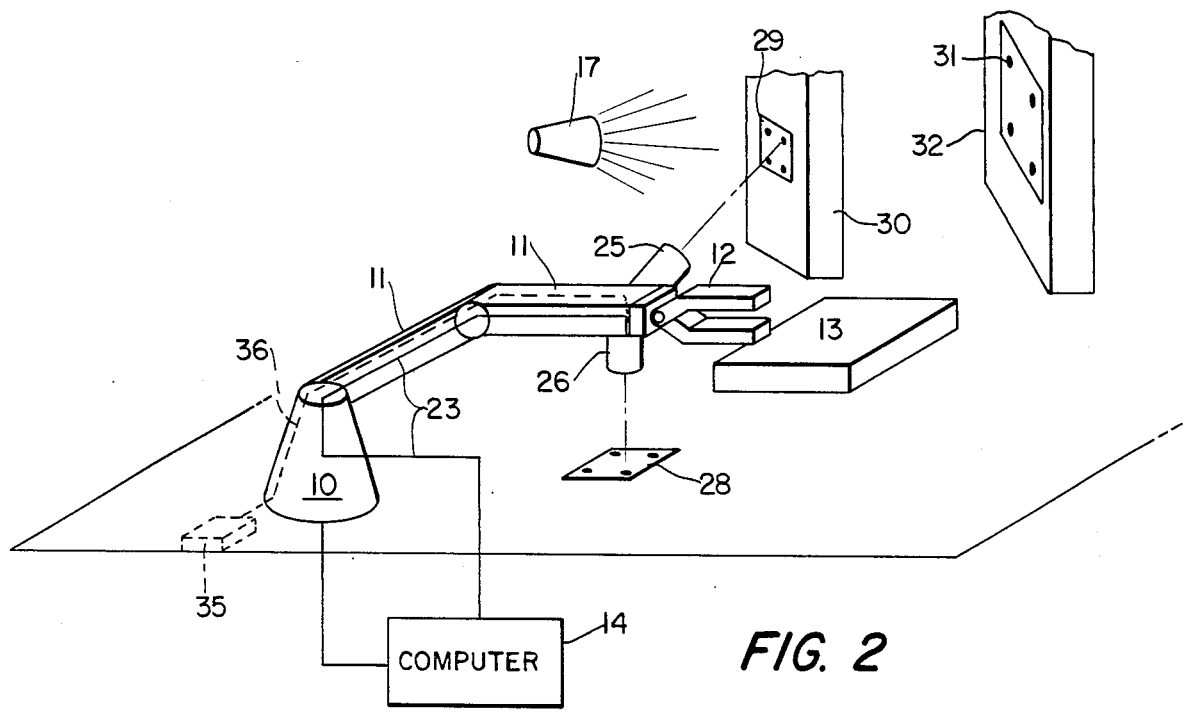
FIG. 2 is a schematic, perspective view similar to FIG. 1 but showing a modification thereof.

FIG. 2 illustrates a calibration system according to the present invention in which the basic features thereof have been reversed, i.e. in this case, the robot arm carries the cameras while the dotted targets are fixed with respect to the work station, i.e. on the floor, on pillars or the like, independently of the robot arm 11. FIG. 2 illustrates a pair of cameras 25 and 26 mounted on the robot arm 11 and targets 28 and 29 fixed to the floor and to a pillar 30, respectively. A larger target 31 is mounted on a more distant pillar 32.

Adding the cameras to the robot arm has the disadvantage of adding additional weight thereto. However, these cameras are relatively light. Moreover, as an improvement thereof, the camera can be located at a remote position, as illustrated diagrammatically at 35, and connected to viewing points at the end of the robot arm 11 through fiber optics 36.

As illustrated in FIG. 2, the robot arm 11 with the cameras thereon moves toward the work station 13 and as it approaches the work station the targets 28 or 29 come within view of the cameras 26 and 25, respectively. As in FIG. 1, four dot matrix targets are desirable, although the system is operable for correcting in all six directions utilizing a minimum of three dots. In the embodiment of FIG. 2, since the targets are not carried by the robot arm, the targets may be larger. Consequently, the accuracy of the solution may be considerably higher than in the case of a single closely spaced target. This is particularly true in range and angle dimensions.

In this embodiment with the targets fixed at selected locations in the vicinity of the work station, additional targets may be provided at especially advantageous points. For example, a target may be located directly behind a work object being conveyed such that when the work is transferred out, the target remains and is viewed by a camera, thus indicating removal of the object. Also, in the embodiment of FIG. 2, many more target views can easily be utilized. Hence, the robot can be calibrated and hence corrected from a variety of angles by simply looking at the same target plate with different cameras or different points in time. This can give improved resolution as encoder errors are statistically averaged and the average of multiple transform equations are used. Since targets are cheap, one or more target plates can be used very easily. In addition, more than one camera can be used on the robot. Two are illustrated in this embodiment. Given the fiber optic system for remotely locating the camera, each camera can view different directions simultaneously.

Also, in FIG. 2, a strobe target illumination light 17 may be used for making readings on-the-fly. This can be important for maximum cycle rate since the robot need not stop. The flash source "freezes" the target image on the photodetector (for example, the matrix array) which then is read out subsequently. To accomplish this on the present matrix arrays, it may be necessary to provide a dump pulse to clear the array moments before the flash.

In this case the trigger to flash generally would come from the robot axis controller which would convey a signal indicating that the robot is at the calibration position. Use of flash sources also provides good background light level discrimination. Where laser or light emitting diode sources are used, further discrimination results by using wave length band pass filters in front of the detector.

It will be noted that the targets may also be located on pallets, on automation equipment or on the objects themselves to provide a very local calibration to the robot axes.

Figure 3A:
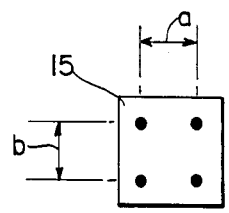
FIGS. 3A and 3B are diammgrammatic views of the target, illustrating the operation of the invention.
Figure 3B:
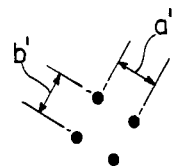

FIGS. 3A and 3B illustrates a practical example of the present invention using a typical four dot matrix target to correct in all six directions, X, Y, Z, $\theta$, $\phi$, $\gamma$, FIG. 3A illustrates the correct reference position of the matrix, i.e. the view of the matrix if the robot arm 11 were perfectly positioned as the target came into the view of the camera. However, FIG. 3B illustrates the matrix as actually viewed by the camera. The target image, as viewed on the computer screen is off center and tilted such that the distances a' and b' are less than the reference distances a and b. This indicates a tilt and also a Z axis range lengthening. These variables can be solved independently given equations such as are known in the photogrammetric art and referred to in the above noted Pinkney et al U.S. Pat. No. 4,219,847.

In addition, the dots in FIG. 3B illustrate that the target is off center in both axes. All of the correction data is then fed into the computer 14 to reset the memory which controls the computers movements, whereupon the servos operating the robot arm 11 are actually moved to reposition the robot so that its target appears as in FIG. 3A. This new position of the correct reading is then locked into the memory and becomes a new reference point from which the robot goes forward.

It is noted that the calibration system does not have to be permanently attached to the robot but can be brought up to it at any time, assuming that some reliable procedure exists for accurately positioning the calibration system for each subsequent application. Thus, once the system has been operated, periodic calibration of many robots in a plant can be done with a single calibration system.

Although the invention has been described in considerable detail with respect to preferred embodiments thereof, it will be apparent that the invention is capable of numerous modifications and variations apparent to those skilled in the art without departing from the spirit and scope of the invention, as defined in the claims.

While target 'dots' have been disclosed, it is understood that other target shapes or features can also be used, for example triangles, squares, reticles, lines etc.

I claim:

1. In combination,
    a robotic apparatus, having an arm and an operative end, for automatically handling or working on an object at a work station;
    a computerized guidance means for controlling movements of the arm and operative end for carrying out an intended handling or working on the object at the work station, said guidance means also serving to move the arm and operative end to a predetermined location immediately adjacent to the work station;
    calibration means for checking and if necessary resetting the computerized guidance means, said calibration means comprising means for sensing the position of the arm and operative end, independently of the guidance means, when the arm and operative end are at the predetermined location immediately adjacent to the work station, and signal means for generating an actual position calibration signal, said sensing means comprising at least one target mounted in the vicinity of the predetermined location of the work station and being mounted independently of the arm and operative end, and at least one camera means for imaging said target from the arm and operative end along a predetermined and fixed line of sight, said camera means comprising a camera device located remote from the arm and operative end and fiber optics located on the arm and operative end for viewing said target and for communicating with the camera device;
    means for comparing the actual position calibration signal against a reference position signal generated by said computerized guidance means and for noting any deviation therebetween; and
    means for resetting the computerized guidance means in response to said deviation.

2. The invention of claim 1, including a plurality of cameras positioned to view a single target.

3. The invention of claim 1, said target comprising a pattern of at least three dots or other features positioned to be viewed by the camera to ascertain the position of the arm and operative end in the X, Y, Z, pitch, roll and yaw directions.

4. The invention of claim 3, said target including four dots arranged in a rectangular pattern.

* * * * *